United States Patent
Yu et al.

(10) Patent No.: US 7,390,223 B2
(45) Date of Patent: Jun. 24, 2008

(54) ELECTRICAL CARD CONNECTOR HAVING GUIDING MEMBER

(75) Inventors: Hung-Chi Yu, Tu-Cheng (TW); Chien-Jen Ting, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/799,767

(22) Filed: May 1, 2007

(65) Prior Publication Data
US 2007/0259547 A1    Nov. 8, 2007

(30) Foreign Application Priority Data
May 2, 2006    (TW) ............... 95207456 U

(51) Int. Cl.
*H01R 24/00* (2006.01)

(52) U.S. Cl. ........................ 439/630; 439/159

(58) Field of Classification Search ................. 439/159, 439/630, 632
See application file for complete search history.

(56) References Cited

U.S. PATENT DOCUMENTS

| | | | |
|---|---|---|---|
| 6,988,904 B1 * | 1/2006 | Lai | 439/159 |
| 7,037,123 B2 | 5/2006 | Nakamura | |
| 7,083,441 B1 * | 8/2006 | Lee | 439/148 |
| 7,090,537 B1 | 8/2006 | Nakamura | |

* cited by examiner

*Primary Examiner*—Truc T Nguyen
(74) *Attorney, Agent, or Firm*—Wei Te Chung

(57) ABSTRACT

An electrical card connector (1) for receiving an electrical card, comprises an insulative housing (2) with a plurality of terminals (3) receiving therein, a shield (4) assembled on the housing, and a base portion (6) on one side of the housing and receiving an ejecting mechanism, the ejecting mechanism comprises a slider (7), the slider forms an engaging block (71) towards to the housing thereon, and during the card inserting, the engaging block engages with a edge of the card.

20 Claims, 7 Drawing Sheets

ELECTRICAL CARD CONNECTOR HAVING GUIDING MEMBER

BACKGROUND OF THE INVENTION

1. Field of the Invention

The present invention relates to an electrical card connector, and particularly to an electrical card connector having a guiding member.

2. Description of Prior Arts

Modern times, the PC card is always used as an external equipment for increase the storage of the electrical consumer products, like Mobile phone, Digital camera, etc. The electrical card connector is used for electrically connecting the PC card and the electrical consumer products. PCMCIA (Personal Computer Memory Card International Association) discloses a new standard PC card in 2003, and name it Express card. There are two types of Express card. The one is L-shaped, and the other one is I-shaped. Accordingly, the Express card connector always is L-shaped for receiving either L-shaped card or I-shaped card.

A normal L-shaped card connector with a receiving space for receiving a card comprises a guiding member for guiding the I-shaped card inserting. The guiding member comprises a L-shaped wall and a guiding channel defining thereon. However, the guiding channel is too short to locate the I-shaped card. Additional, the receiving space too large comparing with the I-shaped card. Thus, the I-shaped card has much probability to be deflected in the card connector.

Obviously, it is desirable to have an electrical card connector with an improved structure.

SUMMARY OF THE INVENTION

An object of the present invention is to provide an electrical connector to prevent a I-shaped card from deflecting during inserting.

To achieve the above object, an electrical card connector for receiving an electrical card, comprises an insulative housing with a plurality of terminals receiving therein, a shield assembled on the housing, and a base portion on one side of the housing and receiving an ejecting mechanism, the ejecting mechanism comprises a slider, the slider forms an engaging block towards to the housing thereon, and during the card inserting, the engaging block engages with an edge of the card.

Other objects, advantages and novel features of the invention will become more apparent from the following detailed description of the present embodiment when taken in conjunction with the accompanying drawings.

DETAILED DESCRIPTION OF THE PREFERRED EMBODIMENT

Figure 1:
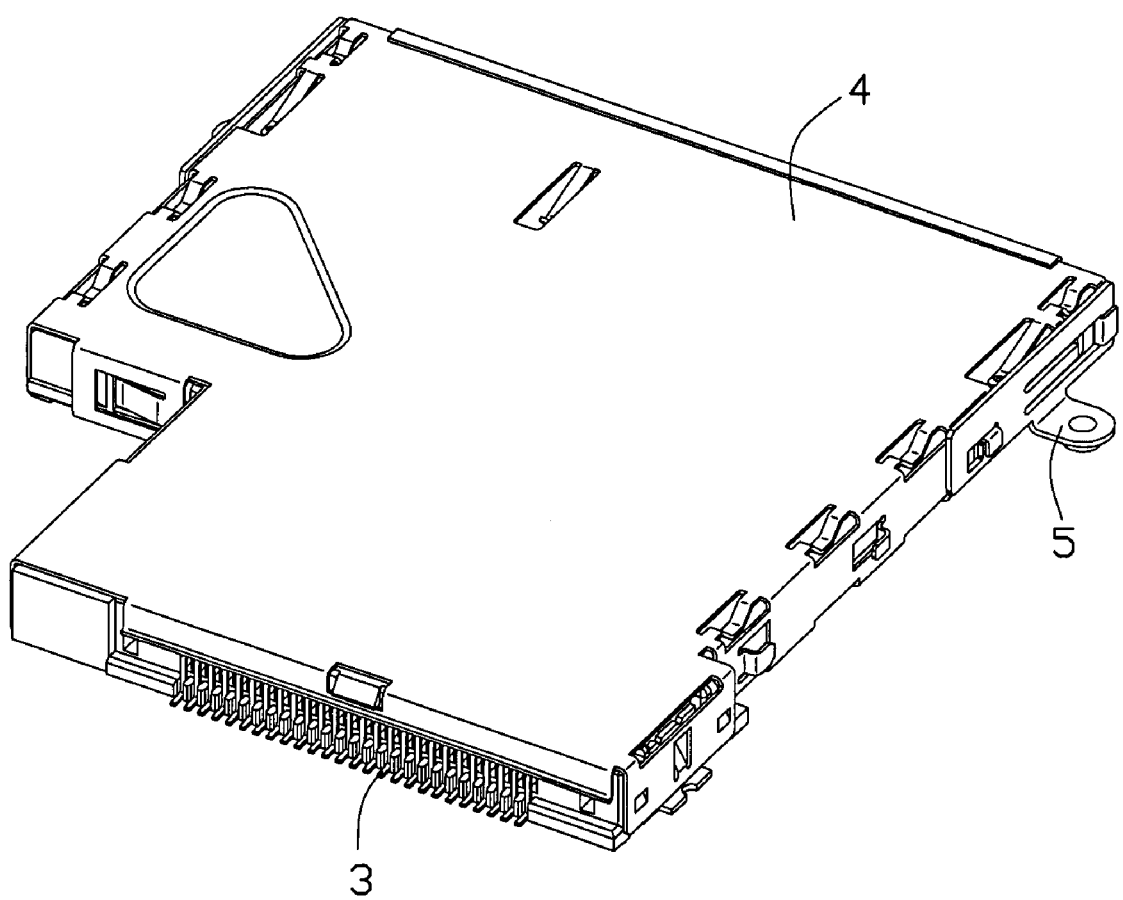
FIG. 1 is an assembled, perspective view of an electrical card connector in accordance with the present invention.
Figure 2:
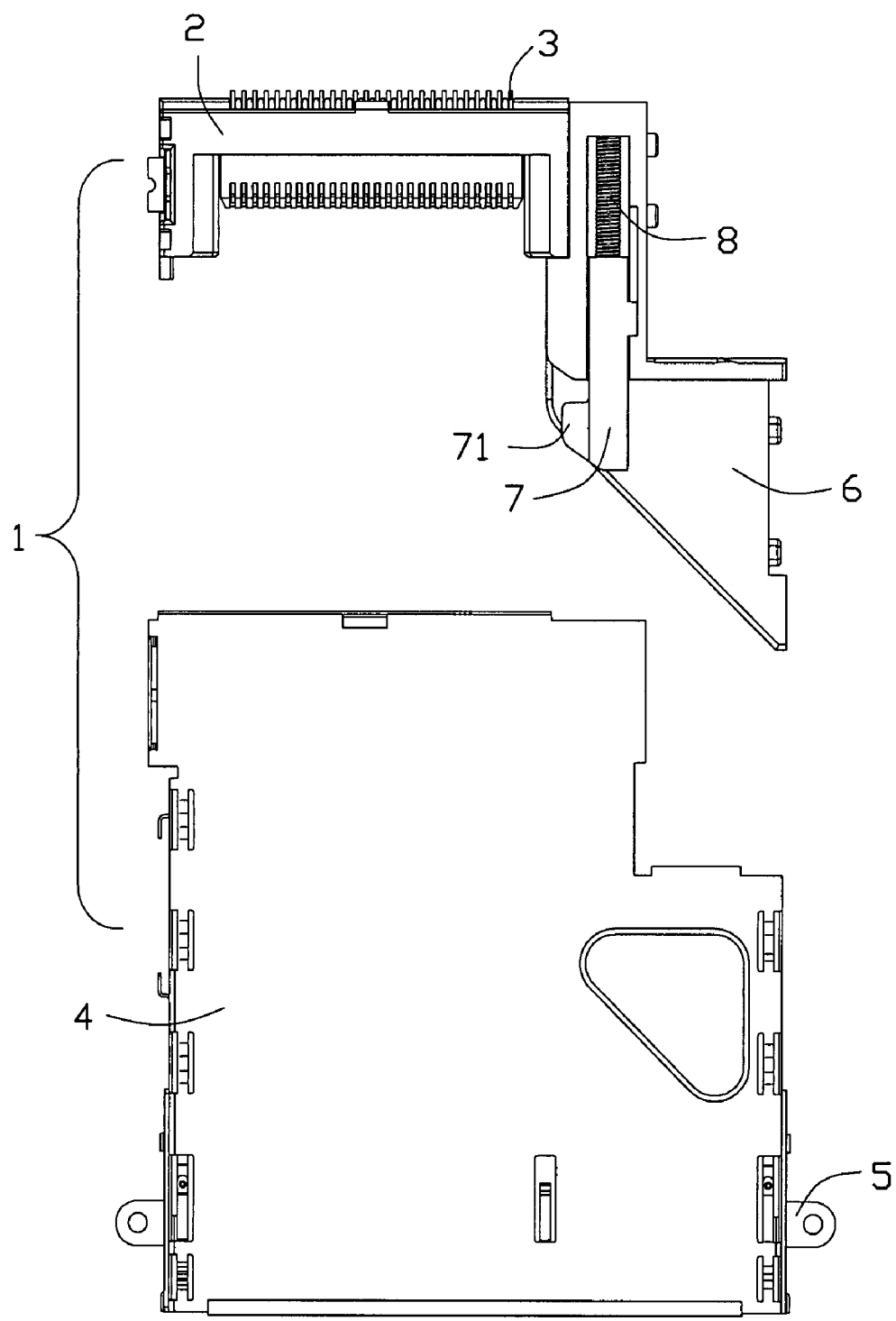
FIG. 2 is a top view of the card connector shown in FIG. 1 with a shield separated.
Figure 3:
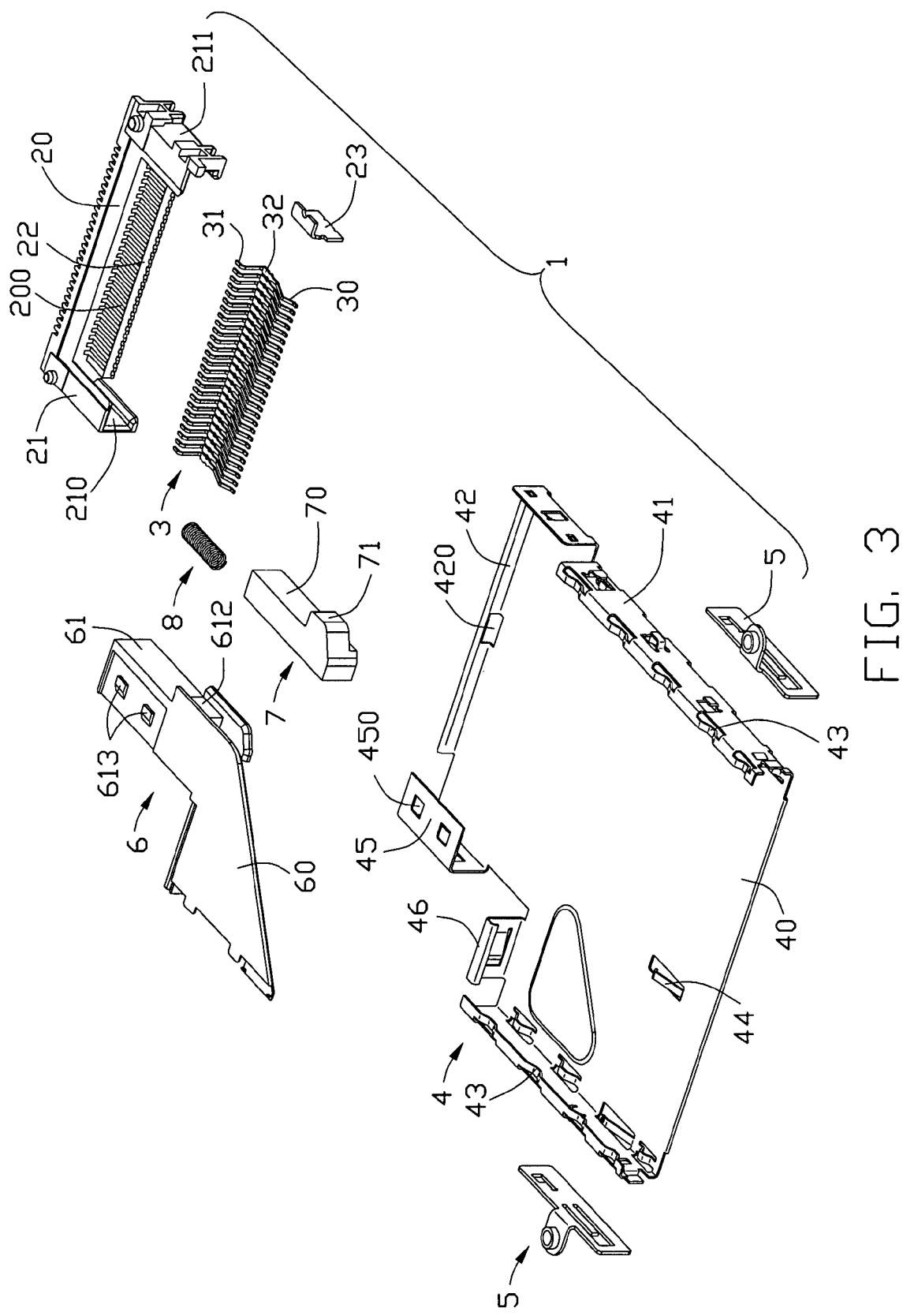
FIG. 3 is an exploded, perspective view of the electrical card connector.
Figure 4:
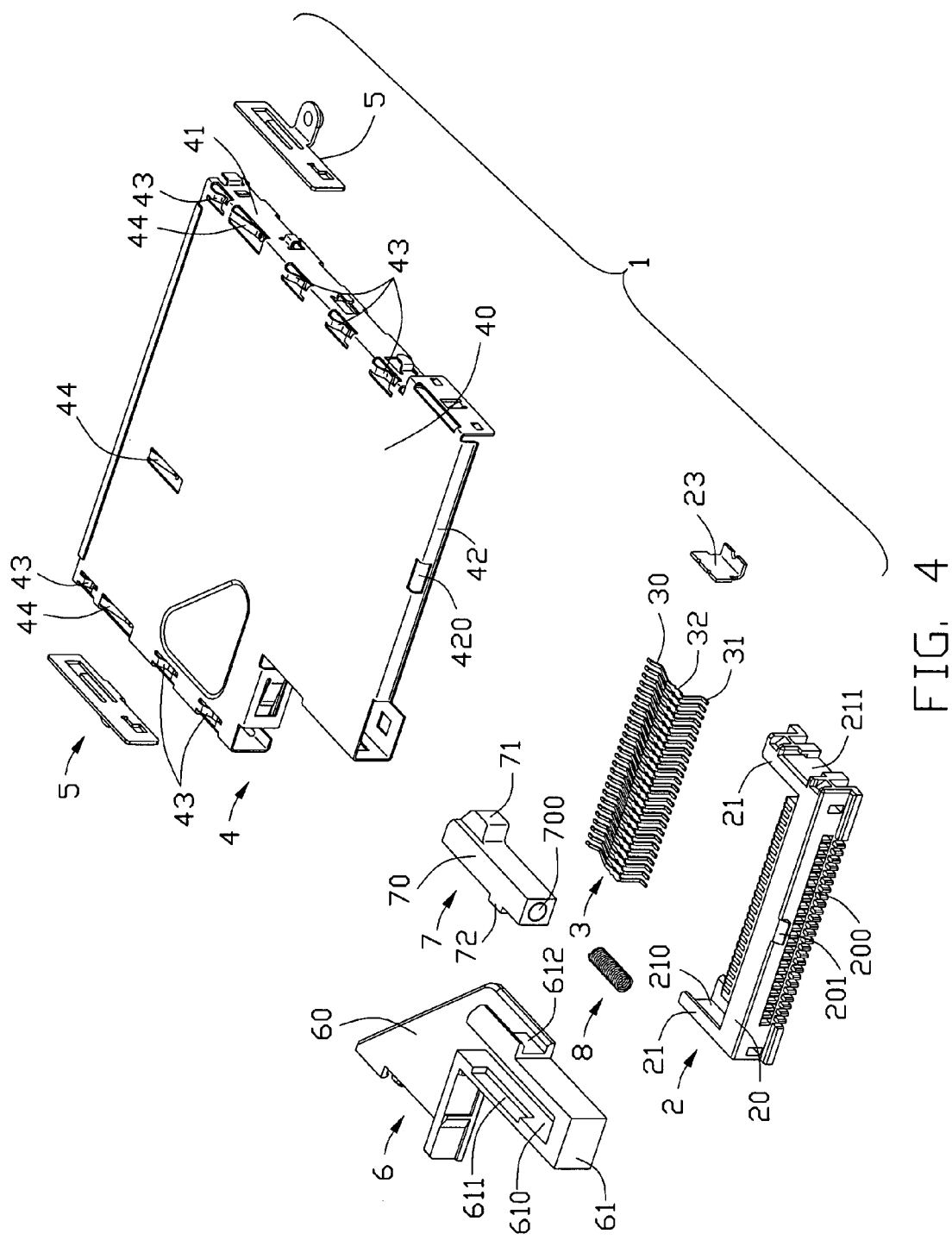
FIG. 4 is a view similar to FIG. 5, but taken from a different aspect.

Referring to FIGS. 1 to 7, an L-shaped electrical card connector 1 comprises an insulative housing 2, a plurality of terminals 3 receiving in the insulative housing 2, a shield 4 enclosing the insulative housing 2, a pair of supporting plate 5 assembled on the opposite sides of the shield 4, and a base portion 6 mounting on a side of the insulative housing 2.

Referring to FIGS. 1 to 4, the housing 2 comprises a main body 20, a pair of arms 21 extending from the opposite ends of the main body 20, and mating portion 22 extending from the main body 20 sandwiched between the arms 21. Each arm 21 defines a guiding channel 210 for guiding the card inserting. The mating portion 22 defines a plurality of passageways 200 for receiving corresponding terminals 3. A block 201 is formed on a front end of the main body 20. Furthermore, the left arm 21 defines a retaining cavity 211 with a metal plate 23 receiving therein.

Each terminal 3 comprises a contacting portion 30 electrically connecting with the card, a soldering portion 31 for soldered on a Print Circuit Board, and a retaining portion 32 receiving in corresponding passageway of the housing 2.

The shield 4 is configured of L-shaped and defines a receiving space (not labeled) with the housing 2. The shield 4 comprises a top plate 40, a pair of lateral plate 41 extending downwardly from the opposite edges of the top plate 40 and a stopping plate 42 with a retaining cutout thereon extending downwardly from a front edge of the top plate 40. Each lateral plate 41 comprises a bottom plate (not labeled) bent horizontally into the receiving space. The top plate 40 and the bottom plates correspondingly forms a plurality of projecting plate 43 for guiding the card inserting. Three resilient tabs 44 are separated formed downwardly from the top cover 40 and arranged in a row. A cutout 400 defined at one side of the shield 4. Thus, there are two edges of the shield 4 adjacent to the cutout 400. Each said edge adjacent to the cutout 400 forms a vertical plate 45, 46. One of the vertical plate 45 defines a plurality of retaining holes 450.

The supporting plates 5 are assembled on the lateral plates 41 of the shield.

The base portion 6 is attached on one side of the housing 2, received in the receiving space and adjacent to the L-shaped cutout. The base portion 6 comprises an L-shaped base 61 and a triangular guiding plate 60 extending from the L-shaped base 61. A slot 610 is defined on the base 61 and a lateral passage 612 is defined on the lateral face of the base 61. The slot 610 further defines a slit 611 therein. A slider 7 is partially and movably received in the slot 610. The slider 7 comprises a base part 70, a projecting block 72 extending into the slit 611, an engaging block 71 out of the slot 610 and a hole 700 at the front end of the base part 70. A spring 8 is completely received in the slot 611 with one end engaging with the hole 700 of the slider 7. The spring 8 and the slider 7 make up of an ejecting mechanism. The lateral passage 612 communicates with one guiding channel 210 for guiding the card inserting. A plurality of protuberances are formed at the base part 61 engaging with the retaining holes 450 for retaining the base portion 6.

Figure 5:
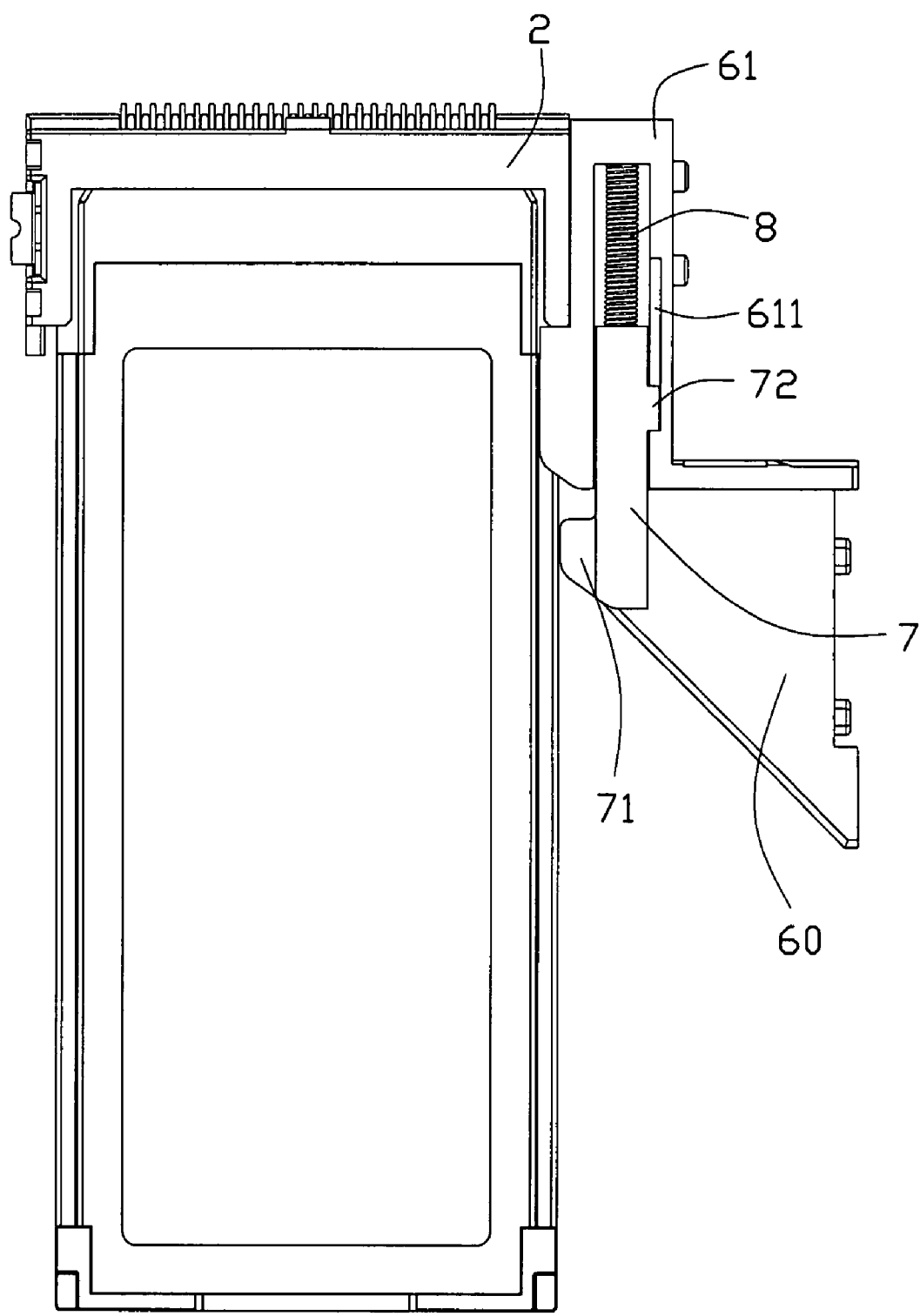
FIG. 5 is a top view of the card connector during an I-shaped card inserting.
Figure 6:
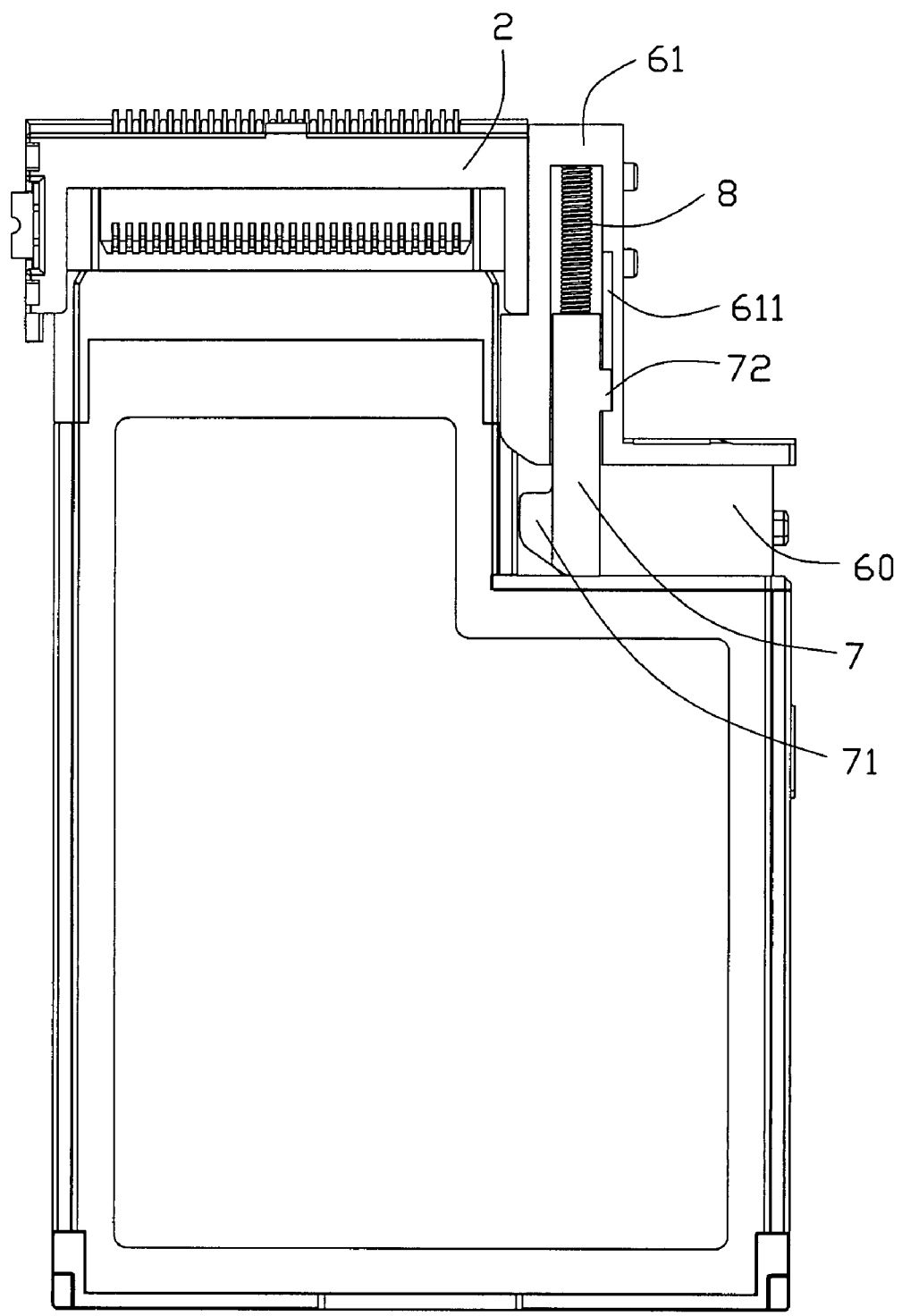
FIG. 6 is a top view of the card connector during an L-shaped card inserting.
Figure 7:
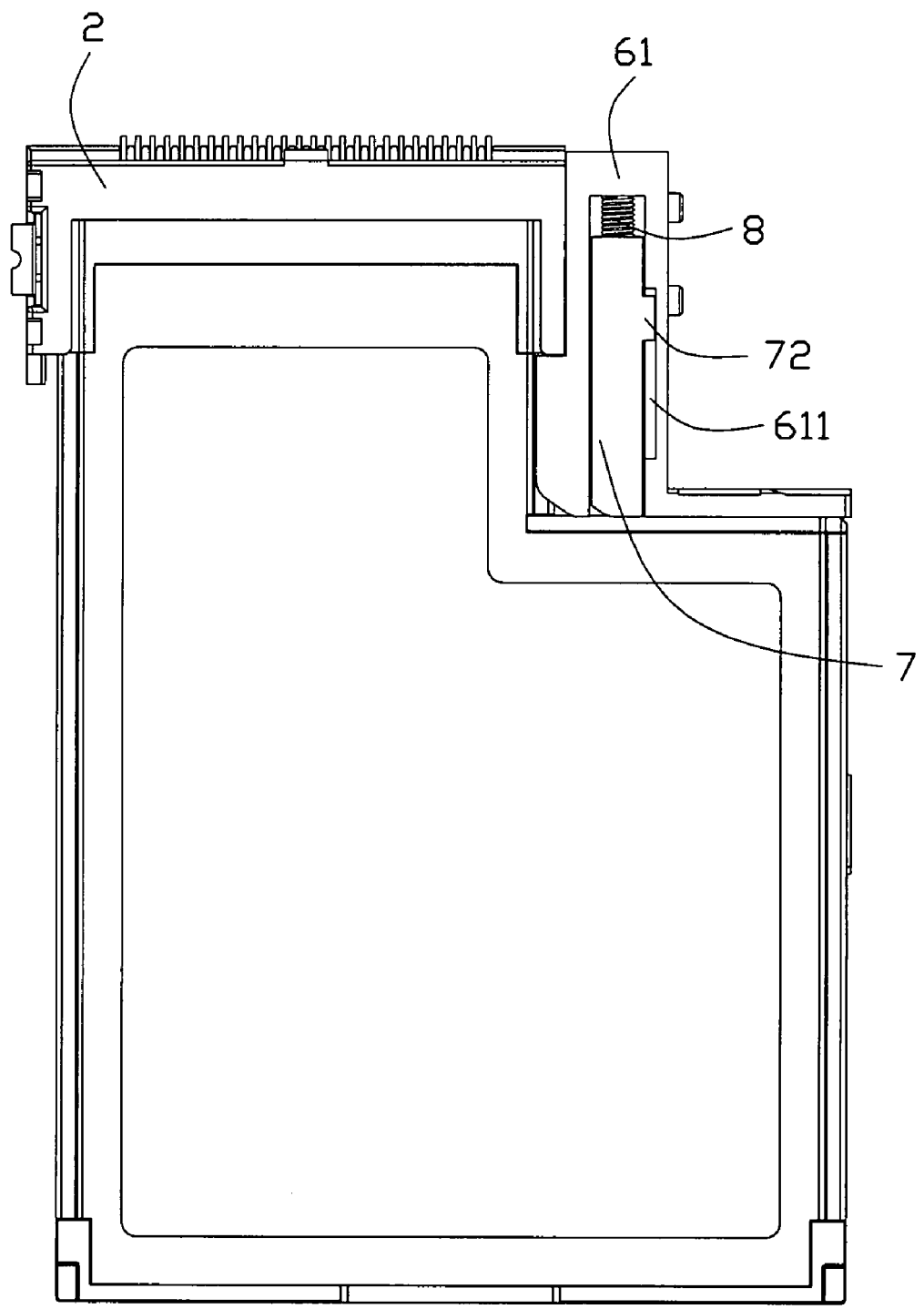
FIG. 7 is a top view of the card connector when an L-shaped card inserting till a right position.

Referring to FIG. 5, Obviously, during the I-shaped card inserting into the receiving space, the engaging block 71 engaging the edge of the card to avoid the card deflecting in the receiving space. Turn to FIGS. 6 and 7, during the L-shaped card inserting into the receiving space, the card presses the slider till the right position. During the L-shaped is ejected from the receiving space, the projecting block 72 receiving in the slit prevent the slider from disengaging from the slot 610.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

We claim:

1. An electrical card connector for receiving an I-shaped type card or an L-shaped type card, comprising:
    an insulative housing with a plurality of terminals received therein;
    an L-shaped shield assembled on the housing defining an L-shaped receiving space for receiving an L-shaped type card; and
    a base portion on one side of the housing and receiving an ejecting mechanism;
    the ejecting mechanism comprising a slider, the slider forming an engaging block and a front side portion;
    wherein the L-shaped receiving space is defined by a first and second rectangular receiving spaces;
    wherein the first rectangular receiving space receives the I-shaped type card;
    wherein the engaging block protruding transversely to card insertion direction and toward the first rectangular receiving space to abut against an lateral side of the I-shaped type card during insertion of the I-shape type card;
    wherein the front side portion abutting against a forward side of a step portion of the L-shaped type card.

2. The electrical card connector as described in claim 1, wherein the base portion defines a slot thereon, said slider partially received in the slot, and the engaging block is outside of the slot.

3. The electrical card connector as described in claim 2, wherein the base portion defines a slit beside and communicating with the slot, the slider comprises a projecting block movably received in the slit.

4. The electrical card connector as described in claim 2, wherein the ejecting mechanism comprises a spring received in the slot.

5. The electrical connector as described in claim 1, wherein the base portion defines a lateral passage on a lateral side thereof for guiding insertion of the card, the engaging block adjacent to the lateral passage.

6. The electrical card connector as described in claim 1, wherein the base portion forms a triangular guiding plate.

7. The electrical card connector as described in claim 1, wherein the shield forms a vertical plate with a plurality of retaining holes thereon, the base portion forms a plurality of protuberances engaging with the retaining holes for retaining the base portion.

8. The electrical card connector as described in claim 1, wherein the base portion is separated from the housing.

9. The electrical card connector as described in claim 1, wherein the shield has a cutout, said base portion is adjacent to the cutout.

10. The electrical card connector as described in claim 1, wherein the shield comprises a top plate, a pair of lateral plate extending downwardly from the opposite edges of the top plate.

11. The electrical card connector as described in claim 10, wherein each lateral plate comprises a bottom plate bent horizontally, the top plate and the bottom plate correspondingly form a plurality of projecting plate.

12. The electrical card connector as described in claim 1, further comprising a pair of supporting plates mounting on the shield.

13. The electrical card connector as described in claim 1, wherein the slider extends into the receiving space to divide the receiving space into a large and a small rectangular receiving spaces, an I-shaped card being limited in the large rectangular space during inserting.

14. An electrical card connector assembly for mutually exclusively respective use with an I-shaped type or an L-shaped type cards, comprising:
    an insulative housing defining a mating port thereof;
    a plurality of contacts disposed in the housing with contacting sections extending into the mating port;
    a base portion located in front of the housing and defining a triangular guiding plate and a base located behind the triangular guiding plate;
    a L-shaped shield cooperating with said housing and said base portion to define an L-shaped card receiving space thereamong, the L-shaped type card receiving space is defined by a first and second rectangular receiving spaces;
    a slider located around and moveable relative to the base portion, said slider defining a front head located in the card receiving space with thereof a lateral side for abutting against a lateral side of the I-shaped type card when said I-shaped type card is inserted into a first card receiving space and mated with the contacts, and with a front side for abutting against a forward side of a step portion of the L-shaped type card when the L-shaped type card is inserted into the card receiving space and mated with the contacts under a condition that the slider is pushed rearward toward the housing by the L-shaped type card with the head leaving the card receiving space;
    wherein the first rectangular receiving space receives the I-shaped type card;
    wherein the front head protruding transversely to card insertion direction and toward the first rectangular receiving space to abut against an lateral side of the I-shaped type card during insertion of the I-shape type card.

15. The electrical card connector assembly as claimed in claim 14, wherein the head of the slider includes a wedge structure in compliance with an oblique edge of the triangular guiding plate.

16. The electrical card connector assembly as claimed in claim 14, wherein said shield is metallic.

17. The electrical card connector assembly as claimed in claim 14, wherein said slider is urged forward by a spring.

18. An electrical card connector assembly for mutually exclusive use with either an I-shaped type card or an L-shaped type card, comprising:
    an insulative housing defining a mating port;
    a plurality of contacts disposed in the housing with contacting sections extending into the mating port;
    a L-shaped shield cooperating with the housing defining an L-shaped card receiving space which said L-shaped type card occupies when mated, the L-shaped card receiving space is defined by a first and second rectangular receiving spaces; and
    a slider moveable relative to the combined shield and housing in a front-to-back direction along with insertion direction of the I-shaped or L-shaped cards; wherein a front head of the slider protruding transversely to the card insertion direction and toward the first rectangular receiving space and supportably laterally abuts against lateral side of the I-shaped type card when said I-shaped type card is mated with the mating port, while the slider is retracted toward the housing in said front-to-back direction when the L-shaped type card is mated with the mating port by engagement with the L-shaped type card in said front-to-back direction;

a front side portion of the slider abutting against a forward side of a step portion of the L-shaped type card.

19. The electrical card connector assembly as claimed in claim 18, wherein the front head is engaged with a forward edge of a step portion of the L-shaped type card.

20. The electrical card connector assembly as claimed in claim 18, wherein said slider is urged forwardly by a spring.

* * * * *